July 7, 1942.  R. G. LE TOURNEAU  2,288,630
LIFT CONTROL MECHANISM FOR CARRYING SCRAPERS
Filed Aug. 1, 1941  2 Sheets-Sheet 1
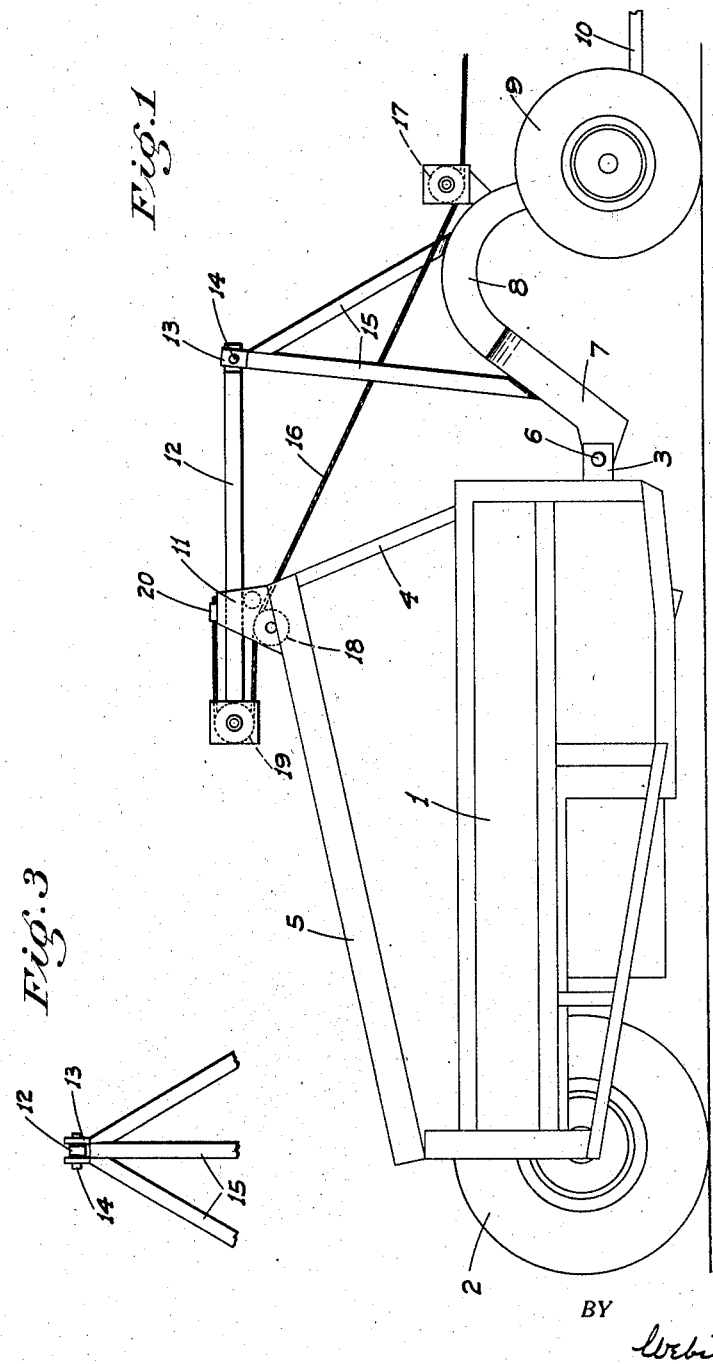
INVENTOR.
R. G. LeTourneau
BY
Webster & Webster
ATTORNEYS

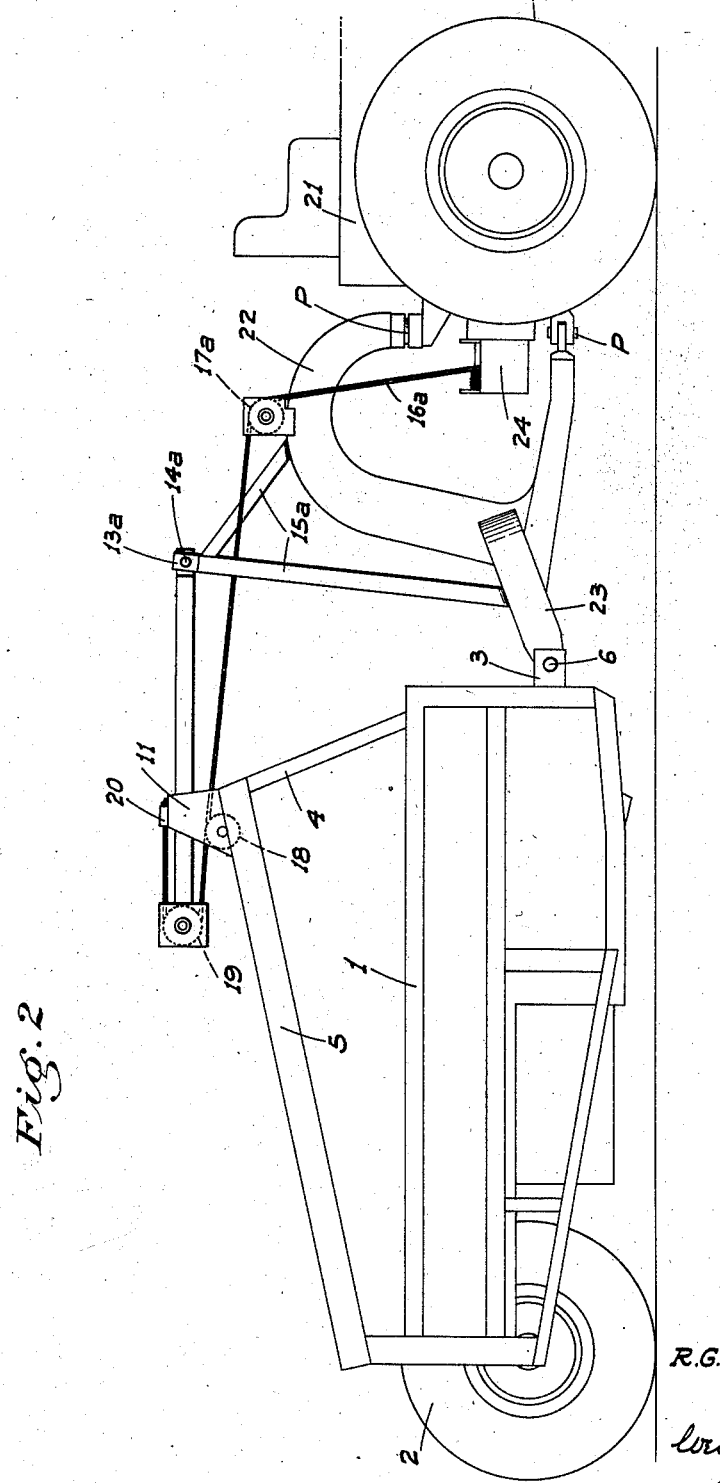

Patented July 7, 1942

2,288,630

UNITED STATES PATENT OFFICE 2,288,630

LIFT CONTROL MECHANISM FOR CARRYING SCRAPERS

Robert Gilmore Le Tourneau, Peoria, Ill., assignor to R. G. Le Tourneau, Inc., a corporation of California Application August 1, 1941, Serial No. 405,035

5 Claims. (Cl. 37—126)

This invention relates to large capacity carrying scrapers of that type in which the bowl is supported by rear wheels and tends to tilt down at its forward end, and which is adapted to be raised and lowered at said end about the wheels as an axis for movement between digging and carrying positions. Such a scraper is shown in my Patent No. 2,112,105 dated March 22, 1938. This scraper has heretofore been mounted in connection either with a front wheel swivel truck adapted for connection with a tractor, as shown in said patent, or as a unit with a two-wheel tractor, as shown in my Patent No. 2,189,072, dated February 6, 1940.

In both cases the scraper bowl is pivoted at the front end adjacent the bottom in connection with the supporting unit—either the two-wheel truck or the tractor—and raising or lowering said end of the bowl has been accomplished with the use of a cable-actuated push or compression bar connected between the bowl and the supporting unit at a level above the point of pivot connection of the bowl with said unit. Heretofore the bar itself has been pivoted on the bowl while the necessary cable sheaves and guide means for the bar have been mounted on said supporting unit. Such an arrangement made it commercially impracticable, due to the necessary duplication of various relatively large and expensive parts of the control mechanism, to use the same scraper with the swivel wheel truck or the two-wheel tractor selectively, and which is frequently desirable.

It is therefore the principal object of the present invention to eliminate this objectionable feature by arranging the lift control mechanism so that a change from one form of support (the swivel truck) to the other (the two-wheel tractor) can be easily and quickly made; and so that the only part of the lift mechanism permanently mounted on the supporting unit itself is a tripod frame of simple construction and having no expensive or moving parts.

A two-wheel tractor thus equipped for connection with this particular scraper can therefore also be used for connection with other implements without having to remove said tripod and without the latter being in the way.

These and other objects I accomplish by means of such structure and relative arrangement of parts as will fully appear by a perusal of the following specification and claims.

In the drawings similar characters of reference indicate corresponding parts in the several views:

Figure 1 is a side outline of a carrying scraper shown as connected to a swivel-wheel truck and equipped with my improved lift control mechanism.

Figure 2 is a similar view but with the wheel truck removed and showing the scraper connected to a two-wheel tractor.

Figure 3 is a fragmentary front end view of a supporting tripod for the push bar.

Referring now more particularly to the characters of reference on the drawings the scraper comprises a rigid bowl 1 supported at its rear end on wheels 2 and having ears 3 projecting forwardly from its front end intermediate the top and bottom. The bowl also has an upstanding cross frame 4 at its forward end and a central longitudinal beam 5 extending rearwardly from the cross frame substantially as shown in said patent, No. 2,112,105.

As shown in Fig. 1 the ears 3 are connected by removable pins 6 to the rear end of side arms 7 of a yoke 8 supported by a swivel-wheel truck 9 which is provided with a tongue 10 adapted for connection with any standard tractor. This yoke is preferably of the same design as shown in my Design Patent No. 119,190, dated February 27, 1940.

Mounted on top of the beam 5 at its forward end is a guide and supporting bracket 11 for the longitudinally extending push or compression bar 12. At its forward end this bar extends between ears 13 and is detachably pivoted thereto by a transverse pin 14. The ears are supported on a tripod frame 15 having a central leg depending with a forward slope to a rigid connection with the yoke 8, and side legs connected to the side arms 7 of the yoke. A control cable 16 projects rearwardly from the tractor (not shown), and is connected to the bar 12 and the bracket 11 in such a manner as to relatively push said bar forward when the cable is pulled, thus of course raising the rear end of the yoke and correspondingly raising the ears 3 and the bowl. The cable is here shown, for purposes of illustration only, as extending through a guide pulley 17 on the yoke, then about a guide pulley 18 on the bracket 11, under and about a pulley 19 mounted on the bar 12 rearwardly of the guide bracket 11, and thence to an anchor on said bracket as at 20. A multiple power increasing sheave arrangement, as shown in Patent No. 2,112,105, will preferably, however, be employed in place of the single lead cable arrangement shown.

The two-wheel tractor 21 illustrated in Fig. 2 is provided with a heavy vertical yoke 22 pivoted on a vertical axis at vertically spaced points on the tractor body at its rear end as at P for relative movement in a horizontal plane, but is held inflexible therewith as to relative movement in a vertical plane in the same basic manner as shown in Patent No. 2,189,072. At its lower end this yoke is provided with rearwardly extending side arms 23 detachably connected to the ears 3 by the pins 6. This yoke is preferably of the same design as shown in my copending design application, Serial No. 102,742 filed Aug. 8, 1941.

The tripod frame 15a is mounted on the yoke and has ears 13a on the top and a removable pin 14a therethrough so that detachable connection may be made with the bar 12. Said tripod is of such a height so that when the yoke is coupled to the ears the compression bar will occupy substantially the same position relative to the scraper as when said bar is connected to the swivel wheel truck, as will be clearly shown by a comparison of Fig. 1 with Fig. 2.

In this case the control cable 16a extends to a guide pulley 17a and thence to the push bar, direct from the power control socket 24 on the rear end of the tractor.

In either case it will be seen that in order to make the change from one type of supporting and draft structure to the other, it is only necessary to remove the pin 14 or 14a and the pins 6, and detach the cable from the anchor 20; withdrawing said cable through the various pulleys so that it remains on the tractor for use with other implements.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In the combination of an implement inherently tending to tip down at its forward end and a supporting unit for said implement in front of the same and tending to tilt down at its rear end under the weight of the implement; a detachable pivot connection between the implement and unit at their adjacent ends, and a tilt control device above the pivot connection, said device including a compression bar extending lengthwise of the implement and unit, controlled operating means between the implement and bar to push the latter relatively forward and means detachably mounting the bar at its forward end on the unit.

2. A structure as in claim 1, in which said detachable pivot connection comprises rearwardly projecting relatively low side members on the unit, ears on the implement at its forward end overlapping the members at their rear end and detachable transverse pivot pins connecting the ears and members.

3. A structure as in claim 1, in which said last named means comprises a frame rigid with and upstanding from the unit and a detachable transverse pivot pin connecting the frame and the bar at its forward end.

4. A structure as in claim 1, with a rigid guide on the implement through which the bar is slidable; said controlled operating means including a sheave on the bar rearwardly of the guide and a pull cable extending from an anchor on the guide, about the sheave and thence forwardly for connection with a hoist drum.

5. In the combination of an implement, a front end support therefor, a detachable pivot connection between the implement and support, said pivotal connection being vertically movable and the implement inherently tending to tilt down at its forward end, and a tilt control device above said pivotal connection; said tilt control device including a compression bar extending lengthwise of the implement and support, controlled operating means between the implement and bar to push the latter relatively forward, and means detachably mounting the bar at its forward end on the support.

ROBERT G. LE TOURNEAU.